United States Patent
Jauquet et al.

(10) Patent No.: US 10,185,310 B2
(45) Date of Patent: Jan. 22, 2019

(54) SYSTEMS AND METHODS FOR ELECTRONICALLY TRACKING A STATUS OF INDUSTRIAL EQUIPMENT

(71) Applicant: Rockwell Automation Technologies, Inc., Mayfield Heights, OH (US)

(72) Inventors: John J. Jauquet, Milwaukee, WI (US); Jimi R. Michalscheck, Racine, WI (US); Kelly A. Michalscheck, Racine, WI (US); Jessica L. Korpela, Milwaukee, WI (US); Kyle K. Reissner, Hudson, OH (US); David A. Vasko, Hartland, WI (US); Matthew W. Fordenwalt, Hudson, OH (US); Matthew R. Ericsson, Lyndhurst, OH (US); Andrew Wilber, Franklin, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 493 days.

(21) Appl. No.: 14/871,018

(22) Filed: Sep. 30, 2015

(65) Prior Publication Data

US 2016/0282828 A1 Sep. 29, 2016

Related U.S. Application Data

(60) Provisional application No. 62/139,182, filed on Mar. 27, 2015.

(51) Int. Cl.
*G05B 19/048* (2006.01)
*G05B 19/418* (2006.01)
(Continued)

(52) U.S. Cl.
CPC .......... *G05B 19/4185* (2013.01); *F16K 31/00* (2013.01); *F16K 35/00* (2013.01);
(Continued)

(58) Field of Classification Search
CPC .. G06Q 10/06; G06Q 10/20; G06Q 10/06311; G06Q 10/06315;
(Continued)

(56) References Cited

U.S. PATENT DOCUMENTS

| 4,075,961 A * | 2/1978 | Harris | D05B 69/36 |
| | | | 112/277 |
| 6,622,137 B1 * | 9/2003 | Ravid | G06Q 10/10 |
| | | | 705/40 |

(Continued)

*Primary Examiner* — Darrin D Dunn
(74) *Attorney, Agent, or Firm* — Fletcher Yoder P.C.

(57) ABSTRACT

In one embodiment, a non-transitory computer readable medium may store computer instructions that, when executed by a processor, cause the processor to receive an input associated with placing a piece of industrial automation equipment offline, determine whether the input corresponds to one or more regulations associated with placing the piece of industrial automation equipment offline, display a first set of instructions regarding how to place the piece of industrial automation equipment offline when the input corresponds to the one or more regulations, and display a second set of instructions regarding how to place the piece of equipment offline when the input does not correspond to the one or more regulations.

19 Claims, 7 Drawing Sheets

(51) Int. Cl.
*G05B 19/042* (2006.01)
*G05B 19/406* (2006.01)
*G07C 9/00* (2006.01)
*F16K 31/00* (2006.01)
*F16K 35/00* (2006.01)
*F16K 37/00* (2006.01)
*H02J 4/00* (2006.01)
*G06F 17/18* (2006.01)
*G07C 3/00* (2006.01)

(52) U.S. Cl.
CPC ........ *F16K 37/0025* (2013.01); *G05B 19/042* (2013.01); *G05B 19/406* (2013.01); *G05B 19/4183* (2013.01); *G05B 19/4184* (2013.01); *G05B 19/41875* (2013.01); *G06F 17/18* (2013.01); *G07C 3/00* (2013.01); *G07C 9/00111* (2013.01); *G07C 9/00309* (2013.01); *G07C 9/00896* (2013.01); *H02J 4/00* (2013.01); *G05B 2219/21147* (2013.01); *G05B 2219/31229* (2013.01); *G05B 2219/32368* (2013.01); *G05B 2219/39251* (2013.01); *G05B 2219/50193* (2013.01); *Y02P 80/11* (2015.11); *Y02P 80/12* (2015.11); *Y02P 90/02* (2015.11); *Y02P 90/10* (2015.11); *Y02P 90/14* (2015.11); *Y02P 90/18* (2015.11); *Y02P 90/22* (2015.11); *Y02P 90/86* (2015.11)

(58) Field of Classification Search
CPC ......... G06Q 10/06375; G06Q 10/0639; G06Q 10/063114; G06Q 10/06316; G05B 23/0278; G05B 23/0283; Y02P 90/14; Y02P 90/86; Y02P 90/10
See application file for complete search history.

(56) References Cited

U.S. PATENT DOCUMENTS

| | | | | |
|---|---|---|---|---|
| 8,594,850 | B1* | 11/2013 | Gourlay | G05B 15/02 700/276 |
| 8,713,236 | B2* | 4/2014 | Kojima | G05B 23/0267 710/301 |
| 9,141,371 | B1* | 9/2015 | Feeser | G06F 8/60 |
| 2002/0081975 | A1* | 6/2002 | Szarka | H04B 1/46 455/517 |
| 2004/0181549 | A1* | 9/2004 | Pate | G05B 23/027 |
| 2005/0288994 | A1* | 12/2005 | Haunschild | G06Q 10/06 705/7.41 |
| 2008/0133178 | A1* | 6/2008 | Byrne | G05B 23/0235 702/184 |
| 2010/0325489 | A1* | 12/2010 | Nakadai | G06F 11/0748 714/26 |
| 2011/0046995 | A1* | 2/2011 | Nishimura | G01H 17/00 705/7.12 |
| 2014/0277612 | A1* | 9/2014 | Justin | G05B 23/0291 700/80 |
| 2014/0283008 | A1* | 9/2014 | Daino | G06F 21/6218 726/17 |
| 2015/0160098 | A1* | 6/2015 | Noda | G05B 23/024 702/35 |

* cited by examiner

SYSTEMS AND METHODS FOR ELECTRONICALLY TRACKING A STATUS OF INDUSTRIAL EQUIPMENT

CROSS REFERENCE TO RELATED APPLICATIONS

This application claims priority from and the benefit of U.S. Provisional Application Ser. No. 62/139,182, entitled "Systems and Methods for Exchanging Information Between Devices in an Industrial Automation Environment," filed Mar. 27, 2015, which is hereby incorporated by reference in its entirety.

BACKGROUND

The present disclosure relates generally to a communication architecture that enables devices in an industrial automation system to share information with each other and thus perform their respective operations more efficiently. More particularly, the present disclosure relates to systems and methods for electronically tracking a status of industrial equipment and assisting in placing the industrial equipment offline.

BRIEF DESCRIPTION

In one embodiment, a non-transitory computer readable medium may store computer instructions that, when executed by a processor, cause the processor to receive an input associated with placing a piece of industrial automation equipment offline, determine whether the input corresponds to one or more regulations associated with placing the piece of industrial automation equipment offline, display a first set of instructions regarding how to place the piece of industrial automation equipment offline when the input corresponds to the one or more regulations, and display a second set of instructions regarding how to place the piece of equipment offline when the input does not correspond to the one or more regulations.

In one embodiment, a method may include receiving, via a processor, an input associated with placing a piece of industrial automation equipment offline, determining, via the processor, whether the input corresponds to one or more government regulations associated with placing the piece of industrial automation equipment offline, displaying, via the processor, a first set of instructions regarding how to place the piece of industrial automation equipment offline when the input corresponds to the one or more government regulations, and displaying, via the processor, a second set of instructions regarding how to place the piece of equipment offline when the input does not correspond to the one or more government regulations.

In one embodiment, a system may include a lock device that may prevent placing a piece of industrial automation equipment online by physically locking the piece of industrial automation equipment when the piece of industrial automation equipment is offline, and a computing device that may receive an input associated with placing the piece of industrial automation equipment offline, determine whether the input corresponds to one or more government regulations associated with placing the piece of industrial automation equipment offline, and display a first set of instructions regarding how to place the piece of industrial automation equipment offline when the input corresponds to the one or more government regulations. The first set of instructions may include a lockout-tagout protocol that specifies using at least the lock device. The computing device may also display a second set of instructions regarding how to place the piece of equipment offline when the input does not correspond to the one or more government regulations. The second set of instructions may not include the lockout-tagout protocol that specifies using the lock device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain energy sources (e.g., electrical, mechanical, hydraulic, pneumatic, chemical, thermal) may be controlled and/or distributed using various types of equipment. Oftentimes, to properly perform maintenance operations on these types of equipment, technicians may place the equipment offline. Placing equipment offline may include removing the equipment from a larger system or circuit by opening a circuit breaker on a supply side of the equipment. However, it should be noted that although the equipment is placed offline, control circuitry of the equipment may remain powered on (e.g., 120 volts) for configuration, communication, and the like. To ensure that the offline equipment is not altered or placed online by another technician, the equipment may be placed offline according to a lockout-tagout protocol. The lockout-tagout protocol may specify certain practices and procedures that technicians should employ when placing certain equipment offline. For example, the lockout-tagout protocol may specify that the operator placing a piece of equipment offline may place a physical lock on the piece of equipment that physically blocks the piece of equipment from being placed back online. With the foregoing in mind, in some instances, the technician may use a computing device (e.g., electronic device), such as a tablet computer or the like, to track equipment that have been placed offline using the lockout-tagout protocol. The computing device may include software that guides the technician through the steps of placing a certain piece of equipment offline according to the lockout-tagout protocol. In addition, the software may track data related to placing the equipment offline when lockout-tagout protocol does not apply.

Generally, equipment is placed offline according to the lockout-tagout protocol when the equipment or another related (e.g., downstream) piece of equipment may not be operating as desired. As disclosed, the lockout-tagout software may guide the technician with regard to properly placing the equipment offline and may also maintain various statistics (e.g., time offline, number of maintenance operations) regarding the equipment being placed offline. In certain embodiments, equipment may be placed offline for reasons other than service procedures that require following the lockout-tagout protocol. For instance, certain pieces of equipment may be placed offline for seasonal maintenance, for security purposes, or the like. In this case, the lockout-tagout software may receive information from the technician regarding a reason for placing a piece of equipment offline. In some embodiments, the software may determine the reason for placing the piece of equipment offline based on the type of maintenance or service done to the equipment. The reasons may include a scheduled maintenance, a routine seasonal machine change, a diagnostic analysis, or the like. In some embodiments, after receiving or determining the reason for placing the piece of equipment offline, the software may determine whether the lockout-tagout protocol should be observed when placing the equipment offline. For example, certain governmental regulations specify that the lockout-tagout protocol should be followed when placing certain types of equipment offline for particular reasons. However, the lockout-tagout protocol may be unnecessary when placing the equipment offline for reasons not specified by the governmental regulations. As such, in some embodiments, if the software determines that the reasons that a piece of equipment is being placed offline do not correspond to certain governmental regulations, the software may present instructions indicating that the operator may not have to use lockout-tagout locks and/or tags when placing the equipment offline. In addition to providing instructions to assist the operator with properly placing equipment offline, the software may also track the reasons for placing the equipment offline and various statistics regarding the equipment being placed offline. These statistics may be helpful in keeping track of the health of the equipment and overall state of the facility in which the equipment operate.

Additionally, in some embodiments, the software may also be used to secure a respective piece of equipment or block the respective piece of equipment from being placed in service. As such, the software may be used as a security feature to block a piece of equipment from being activated remotely. The software may perform one or more operations that result in the piece of equipment being incapable of activating in a normal manner. For example, the software may remove a power supply (e.g., open a circuit breaker) from a piece of equipment or a controller associated with the piece of equipment, delay reactivating the piece of equipment until desired updates are installed, send a command to a lock device that may physically lock the piece of equipment, and so forth. Additional details regarding the above-described embodiments will be discussed in detail below.

Figure 1:
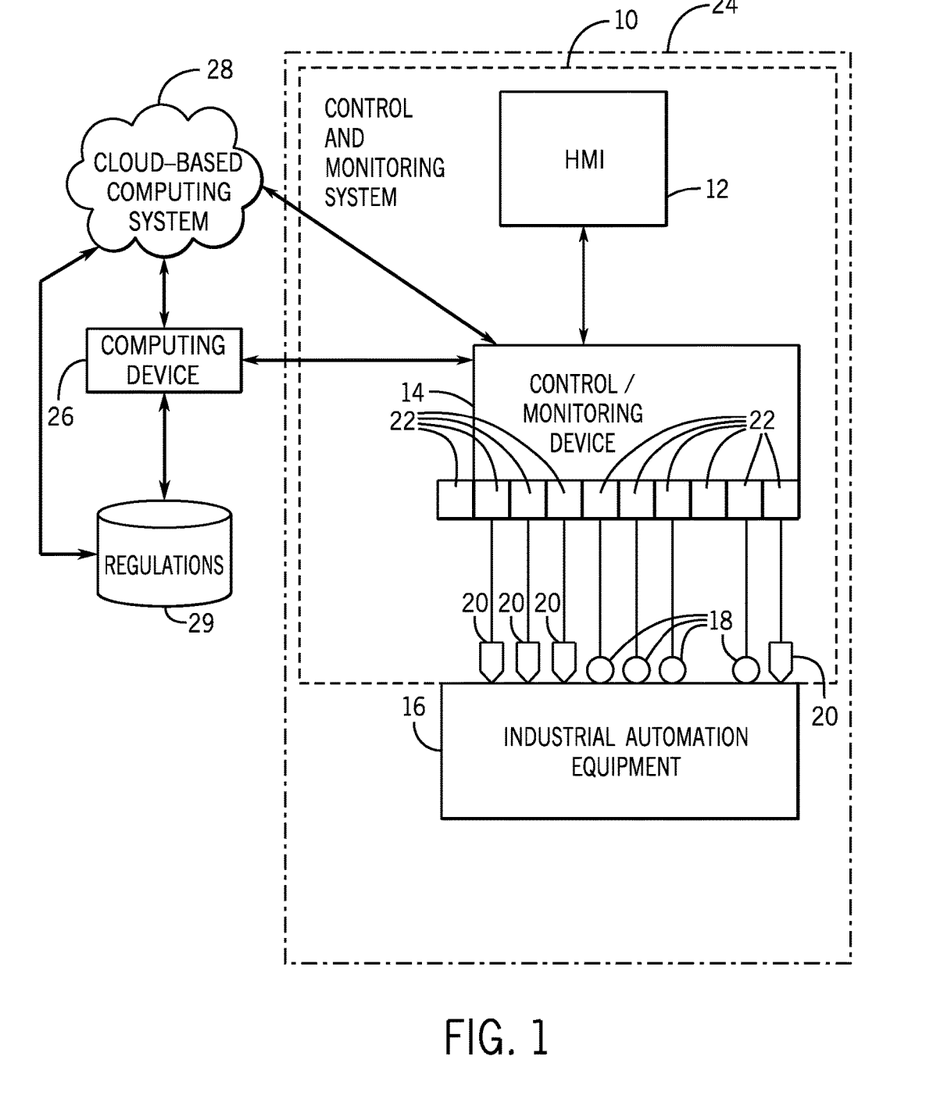
FIG. 1 is a diagrammatical representation of an exemplary control and monitoring system, in accordance with embodiments presented herein.

FIG. 1 is a diagrammatical representation of an exemplary control and monitoring system 10, in accordance with embodiments presented herein. In FIG. 1, the control and monitoring system 10 is illustrated as including a human machine interface (HMI) 12 and a control/monitoring device or automation controller 14 adapted to interface with devices that may monitor and control various types of industrial automation equipment 16. It should be noted that such an interface in accordance with embodiments of the present techniques may be facilitated by the use of certain network strategies. Indeed, an industry standard network may be employed, such as DeviceNet, to enable data transfer. Such networks permit the exchange of data in accordance with a predefined protocol, and may provide power for operation of networked elements.

The industrial automation equipment 16 may take many forms and include devices for accomplishing many different and varied purposes. For example, the industrial automation equipment 16 may include machinery used to perform various operations in a compressor station, an oil refinery, a batch operation for making food items, a mechanized assembly line, and so forth. Accordingly, the industrial automation equipment 16 may comprise a variety of operational components, such as electric motors, valves, actuators, temperature elements, pressure sensors, or a myriad of machinery or devices used for manufacturing, processing, material handling, and other applications.

Additionally, the industrial automation equipment 16 may include various types of equipment that may be used to perform the various operations that may be part of an industrial application. For instance, the industrial automation equipment 16 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 16 may also include controllers, input/output (I/O) modules, motor control centers, motors, human machine interfaces (HMIs), operator interfaces, contactors, starters, sensors 18, actuators 20, drives, relays, protection devices, switchgear, compressors, sensor, actuator, firewall, network switches (e.g., Ethernet switches, modular-managed, fixed-managed, service-router, industrial, unmanaged, etc.) and the like.

In certain embodiments, one or more properties of the industrial automation equipment 16 may be monitored and controlled by certain equipment for regulating control variables used to operate the industrial automation equipment 16. For example, sensors 18 and actuators 20 may monitor various properties of the industrial automation equipment 16 and may adjust operations of the industrial automation equipment 16, respectively.

In some cases, the industrial automation equipment 16 may be associated with devices used by other equipment. For instance, scanners, gauges, valves, flow meters, and the like may be disposed on industrial automation equipment 16. Here, the industrial automation equipment 16 may receive data from the associated devices and use the data to perform their respective operations more efficiently. For example, a controller (e.g., control/monitoring device 14) of a motor drive may receive data regarding a temperature of a connected motor and may adjust operations of the motor drive based on the data.

In certain embodiments, the industrial automation equipment 16 may include a computing device and/or a communication component that enables the industrial equipment 16 to communicate data between each other and other devices. The communication component may include a network interface that may enable the industrial automation equipment 16 to communicate via various protocols such as EtherNet/IP®, ControlNet®, DeviceNet®, or any other industrial communication network protocol. Alternatively, the communication component may enable the industrial automation equipment 16 to communicate via various wired or wireless communication protocols, such as Wi-Fi, mobile telecommunications technology (e.g., 2G, 3G, 4G, LTE), Bluetooth®, near-field communications technology, and the like.

The sensors 18 may be any number of devices adapted to provide information regarding process conditions. The actuators 20 may include any number of devices adapted to perform a mechanical action in response to a signal from a controller (e.g., the automation controller 14). The sensors 18 and actuators 20 may be utilized to operate the industrial automation equipment 16. Indeed, they may be utilized within process loops that are monitored and controlled by the control/monitoring device 14 and/or the HMI 12. Such a process loop may be activated based on process inputs (e.g., input from a sensor 18) or direct operator input received through the HMI 12. As illustrated, the sensors 18 and actuators 20 are in communication with the control/monitoring device 14. Further, the sensors 18 and actuators 20 may be assigned a particular address in the control/monitoring device 14 and receive power from the control/monitoring device 14 or attached modules.

Input/output (I/O) modules 22 may be added or removed from the control and monitoring system 10 via expansion slots, bays or other suitable mechanisms. In certain embodiments, the I/O modules 22 may be included to add functionality to the control/monitoring device 14, or to accommodate additional process features. For instance, the I/O modules 22 may communicate with new sensors 18 or actuators 20 added to monitor and control the industrial automation equipment 16. It should be noted that the I/O modules 22 may communicate directly to sensors 18 or actuators 20 through hardwired connections or may communicate through wired or wireless sensor networks, such as Hart or IOLink.

Generally, the I/O modules 22 serve as an electrical interface to the control/monitoring device 14 and may be located proximate or remote from the control/monitoring device 14, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, EtherNet/IP, and so forth), ControlNet, DeviceNet or other network protocols (Foundation Fieldbus (H1 and Fast Ethernet) Modbus TCP, Profibus) and also communicate to higher level computing systems.

In the illustrated embodiment, several of the I/O modules 22 are configured to transfer input and output signals between the control/monitoring device 14 and the industrial automation equipment 16. As illustrated, the sensors 18 and actuators 20 may communicate with the control/monitoring device 14 via one or more of the I/O modules 22 coupled to the control/monitoring device 14.

In certain embodiments, the control/monitoring system 10 (e.g., the HMI 12, the control/monitoring device 14, the sensors 18, the actuators 20, the I/O modules 22) and the industrial automation equipment 16 may make up an industrial application 24. The industrial application 24 may involve any type of industrial process or system used to manufacture, produce, process, or package various types of items. For example, the industrial applications 24 may include industries such as material handling, packaging industries, manufacturing, processing, batch processing, and the like.

In certain embodiments, the control/monitoring device 14 may be communicatively coupled to a computing device 26 and a cloud-based computing system 28. In this network, input and output signals generated from the control/monitoring device 14 may be communicated between the computing device 26 and the cloud-based computing system 28. Further, the computing device 26 and/or the cloud-based computing system 28 may be communicatively coupled with a regulations database 29 and may query the regulations database 29 to determine when certain protocols should be performed for certain operations. For example, the regulations database 29 may include government regulations that specify that certain protocols (e.g., lockout-tagout) should be followed when certain operations (e.g., placing a piece of industrial automation equipment 16 offline) are performed for certain reasons (e.g., scheduled maintenance, abnormal behavior). As discussed in detail below, appropriate instructions to carry out the desired operation may be displayed on the computing device 26 when the operation is being performed for a reason specified in the government regulations stored in regulations database 29. Additionally, the regulations database 29 may include industry regulations, proprietary regulations, or the like.

Figure 2:
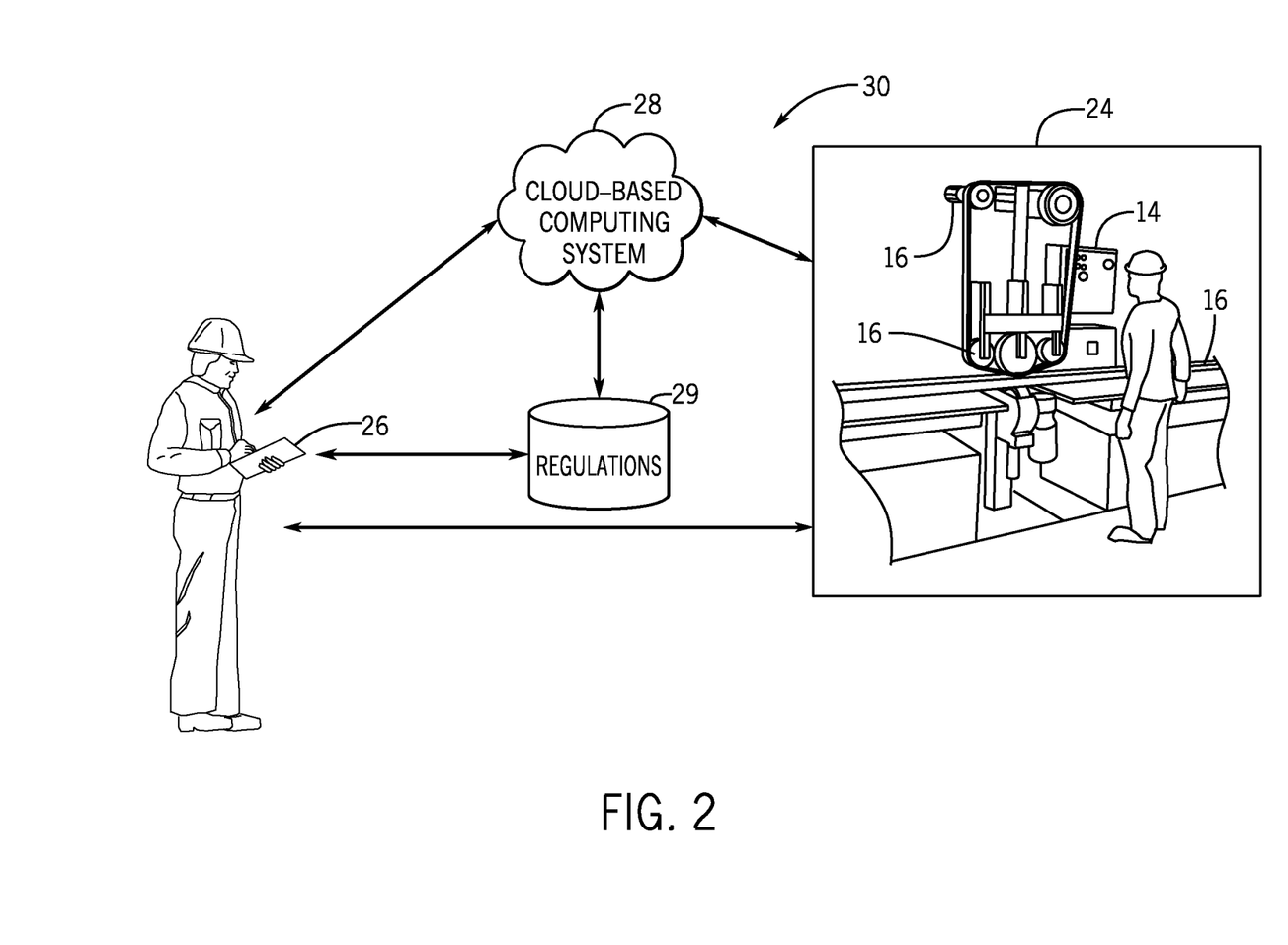
FIG. 2 is a schematic representation of a communication network, in accordance with embodiments presented herein.

FIG. 2 is a schematic representation of a communication network 30 that enables devices to communicate with each other within an industrial application, in accordance with embodiments presented herein. As such, the communication network 30 enables devices that are part of the industrial application 24 to communicate with each other and with other devices that are not part of the industrial application 24. As mentioned above, the industrial application 24 may be in the material handling, packaging industries, manufacturing, processing, batch processing, or any technical field that employs the use of the industrial automation equipment 16.

With the foregoing in mind, in one embodiment, data acquired by the industrial automation equipment 16 may be transmitted to a computing device 26. The computing device 26 may be a computing device that may include communication abilities, processing abilities, and the like. For example, the computing device 26 may be any general computing device that may monitor, control, and/or operate one or more of the industrial automation equipment 16. As such, the computing device 26 may be a laptop computer, a tablet computer, a mobile phone device computing device, a general personal computer, a wearable computing device, or the like. Additional details regarding the computing device 26 will be discussed below with reference to FIG. 3.

Figure 4:
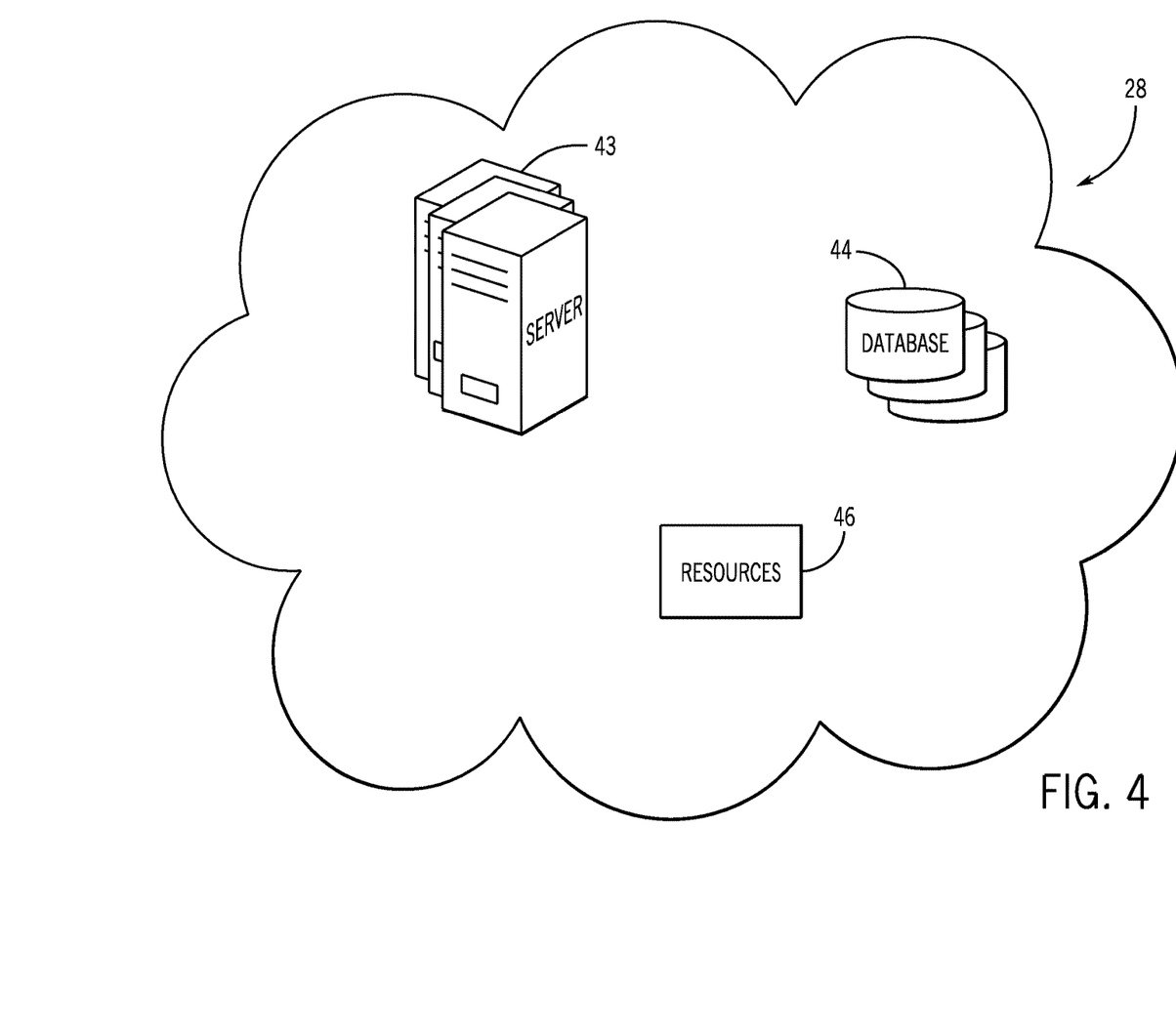
FIG. 4 is a block diagram of example components within a cloud-based computing system of the communication network of FIG. 2, in accordance with embodiments presented herein.

In addition to communicating with the industrial automation equipment 16, the computing device 26 may also communicate with the cloud-based computing system 28. As mentioned above, the computing device 26 and/or the cloud-based computing system 28 may be communicatively coupled with the regulations database 29 and may query the regulations database 29 to determine when certain protocols should be performed for certain operations. The cloud-based computing system 28 may be a cloud-accessible platform that may include one or more servers, one or more computing devices (e.g., general purpose computers), and the like. In any case, the cloud-based computing system 28 may include a number of computers that may be connected through a real-time communication network, such as the Internet, Ethernet, EtherNet/IP, ControlNet, or the like, such that the multiple computers may operate together as a single entity. The real-time communication network may include any network that enables various devices to communicate with each other at near real-time or such that data is communicated with each other at near instantaneous speeds. In one embodiment, the cloud-based computing system 28 may be capable of communicating with the industrial automation equipment 16 and the computing device 26. As such, the cloud-based computing system 28 may be capable of wired or wireless communication between the industrial automation equipment 16 and the computing device 26. In one embodiment, the cloud-based computing system 28 may be accessible via the Internet or some other network.

After establishing a communication connection between the computing device 26 and the industrial automation equipment 16 (e.g., via an associated control/monitoring device 14 or computing device of the industrial automation equipment 16), the cloud-based computing system 28 may receive data acquired by the computing device 26 and the industrial automation equipment 16. After receiving this data, in one embodiment, the cloud-based computing system 28 may perform large-scale data analysis operations on the data, such that the operations may be distributed over the computers that make up the cloud-based computing system 28.

In another embodiment, the cloud-based computing system 28 may forward acquired data or analyzed data to different computing devices, various industrial automation equipment, or the like. As such, the cloud-based computing system 28 may maintain a communication connection with various industrial automation equipment 16, computing devices 26, and the like. Additional details regarding the cloud-based computing system 28 will be discussed below with reference to FIG. 4.

Figure 3:
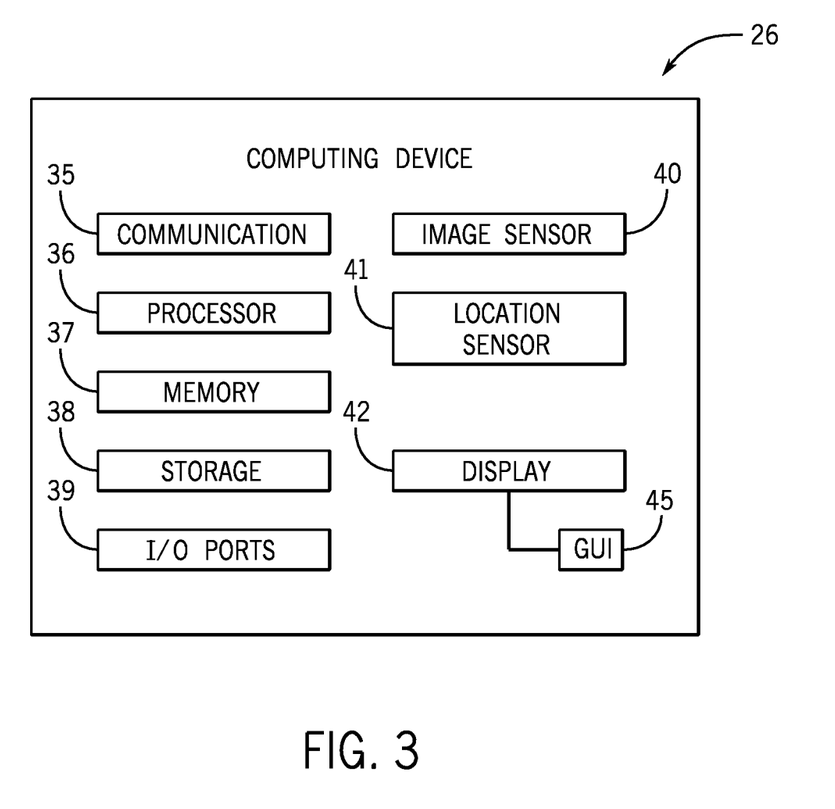
FIG. 3 is a block diagram of example components within a computing device that is part of the communication network of FIG. 2, in accordance with embodiments presented herein.

FIG. 3 is a block diagram of example components within the computing device 26 that is part of the communication network 30, in accordance with embodiments presented herein. For example, the computing device 26 may include a communication component 35, a processor 36, a memory 37, a storage 38, input/output (I/O) ports 39, an image sensor 40 (e.g., a camera), a location sensor 41, a input/display 42, additional sensors (e.g., vibration sensors, temperature sensors) and the like. The communication component 35 may be a wireless or wired communication component that may facilitate communication between the industrial automation equipment 16, the cloud-based computing system 28, regulations database 29, and other communication capable devices.

The processor 36 may be any type of computer processor or microprocessor capable of executing computer-executable code. The processor 36 may also include multiple processors that may perform the operations described below. The memory 37 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 36 to perform the presently disclosed techniques. Generally, the processor 36 may execute software applications that include programs that enable a user to track and/or monitor operations of the industrial automation equipment 16 via a local or remote communication link. That is, the software applications may communicate with the control/monitoring device 14 and gather information associated with the industrial automation equipment 16 as determined by the control/monitoring device 14, via sensors disposed on the industrial automation equipment 16, and the like.

The memory 37 and the storage 38 may also be used to store the data, analysis of the data, the software applications, and the like. The memory 37 and the storage 38 may represent non-transitory computer-readable media (e.g., any suitable form of memory or storage) that may store the processor-executable code used by the processor 36 to perform various techniques described herein. It should be noted that non-transitory merely indicates that the media is tangible and not a signal.

In one embodiment, the memory 37 and/or storage 38 may include a software application that may be executed by the processor 36 and may be used to monitor, control, access, or view one of the industrial automation equipment 16. As such, the computing device 26 may communicatively couple to industrial automation equipment 16 or to a respective computing device of the industrial automation equipment 16 via a direct connection between the devices or via the cloud-based computing system 28. The software application may perform various functionalities, such as track statistics of the industrial automation equipment 16, store reasons for placing the industrial automation equipment 16 offline, determine reasons for placing the industrial automation equipment 16 offline, secure industrial automation equipment 16 that is offline, deny access to place an offline industrial automation equipment 16 back online until certain conditions are met, and so forth.

The I/O ports 39 may be interfaces that may couple to other peripheral components such as input devices (e.g., keyboard, mouse), sensors, input/output (I/O) modules, and the like. I/O modules may enable the computing device 26 to communicate with the industrial automation equipment 16 or other devices in the industrial automation system via the I/O modules.

The image sensor 40 may include any image acquisition circuitry such as a digital camera capable of acquiring digital images, digital videos, or the like. The location sensor 41 may include circuitry designed to determine a physical location of the computing device 26. In one embodiment, the location sensor 41 may include a global positioning system (GPS) sensor that acquires GPS coordinates for the computing device 26. In another embodiment, the location sensor 41 may include other circuitry such as a radio wave transmitter, an infrared sensor, and the like that may acquire data that may be used to determine a location of the computing device 26 with respect to other industrial automation equipment 16 or other fixtures in the industrial automation system. In certain embodiments, the computing device 26 may also include various other sensors that may provide additional data related to an environment in which the computing device 26 exists. For instance, the other sensors may include an accelerometer, a gas (e.g., smoke, carbon monoxide) sensor, or the like.

The display 42 may depict visualizations associated with software or executable code being processed by the processor 36. In one embodiment, the display 42 may be a touch display capable of receiving inputs (e.g., parameter data for operating the industrial automation equipment 16) from a user of the computing device 26. As such, the display 42 may serve as a user interface to communicate with the industrial automation equipment 16. The display 42 may be used to display a graphical user interface (GUI) 45 for operating the industrial automation equipment 16, for tracking the maintenance of the industrial automation equipment 16, performing various procedures (e.g., lockout-tagout, placing device offline, replacing component, servicing device) for the industrial automation equipment 16, and the like. For example, the display 42 may display instructions for placing the industrial automation equipment 16 offline according to the lockout-tagout protocol or instructions for placing the industrial automation equipment 16 offline without following the lockout-tagout protocol. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the industrial automation equipment 16 or for a number of pieces of industrial automation equipment in the industrial application 24, to control the general operations of the industrial application 24. In some embodiments, the operator interface may be characterized as the HMI 12, a human-interface machine, or the like.

Although the components described above have been discussed with regard to the computing device 26, it should be noted that similar components may make up the control/monitoring device 14. Moreover, the computing device 26 may also be part of the industrial automation equipment 16, and thus may monitor and control certain operations of the industrial automation equipment 16. Further, it should be noted that the listed components are provided as example components and the embodiments described herein are not to be limited to the components described with reference to FIG. 3.

FIG. 4 is a block diagram of example components within the cloud-based computing system 28 of the communication network 30 of FIG. 2, in accordance with embodiments presented herein. As mentioned above, the cloud-based computing system 28 may include a number of computing devices, such as servers 43 that may be communicatively coupled to each other and may distribute various tasks between each other to perform the tasks more efficiently. In certain embodiments, each server 43 may include the example components described above as part of the computing device 26 in FIG. 3.

The cloud-based computing system 28 may also have access to a number of databases 44 including the regulations database 29, for instance. The databases 44 may be related to various aspects of the industrial automation system, the industrial automation equipment 16, the computing device 26, operators of the computing device 26 or the industrial automation equipment 16, or the like. For example, the databases 44 may include information regarding procedures for operating and/or maintaining the industrial automation equipment 16. The procedures, as such, may include steps to perform, tools to use, personal protective equipment to wear, and the like with regard to the operations being performed.

The databases 44 may also include information regarding various regulations related to how the industrial automation equipment 16 should be maintained or operated. Additionally, the regulations may be related to how maintenance operations should be documented by the user of the computing device 26. The regulations may be similar to or different than the regulations (e.g., government regulations) maintained in the regulations database 29, to which the cloud-based computing system 28 also has access. The databases 44 may also include data related to warranty information for the industrial automation equipment 16, service contact information related to the industrial automation equipment 16, manuals for operating the industrial automation equipment 16, and other information that may be useful to an operator of the industrial automation equipment 16.

In certain embodiments, the cloud-based computing system 28 may also include access to various resources 46. The resources 46 may be a database or collection of published documents or webpages that may be related to the industrial automation equipment 16. As such, the resources 46 may be accessed by the cloud-based computing system 28 available via the Internet or other communication networks. The cloud-based computing system 28 may search or consult the resources 46 to acquire data related to the industrial automation equipment 16. For instance, the resources 46 may provide information regarding product recalls or safety concerns related to the industrial automation equipment 16, weather advisory notices for the industrial automation system, and the like. Additionally, the resources 46 may include hardware, software or firmware updates, software patches, vulnerability patches, certificates, and the like.

Figure 5:
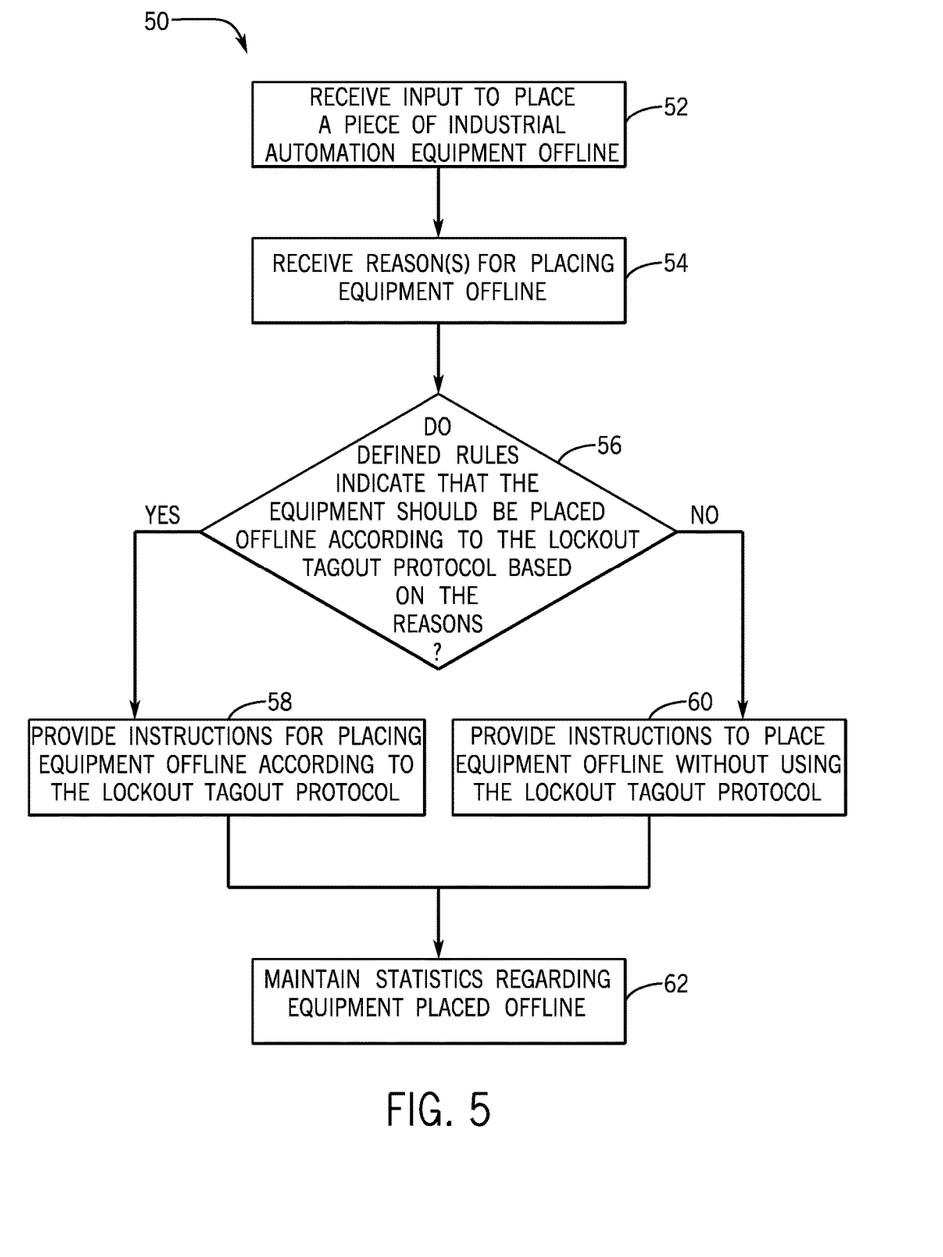
FIG. 5 is a flow chart of a method employed by a computing device for providing instructions for placing industrial automation equipment offline based on defined rules, in accordance with embodiments presented herein.

FIG. 5 is a flow chart of a method 50 employed by the computing device 26 for providing instructions for the placing industrial automation equipment 16 offline based on defined rules (e.g., governmental regulations), in accordance with embodiments presented herein. The method 50 may be implemented as computer instructions stored on the one or more tangible, non-transitory computer-readable medias (e.g., memories 37) and executable by the one or more processors 36. Although the following description of the method 50 is provided with reference to the processor 36 of the computing device 26, it should be noted that the method 50 may be performed by one or more other processors disposed on other devices that may be capable of communicating with the cloud-based computing system 28, the control/monitoring device 14, the industrial automation equipment 16, or other components associated with the industrial application 24. Additionally, although the following method 50 describes a number of operations that may be performed, it should be noted that the method 50 may be performed in a variety of suitable orders and all of the operations may not be performed. It should be appreciated that the method 50 may be wholly executed by the computing device 26 (e.g., tablet) or the execution may be distributed between the cloud-based computing system 28 and the computing device 26.

Referring now to the method 50, the processor 36 may receive (block 52) some input data related to placing a piece of the industrial automation equipment 16 offline. The input data may be entered by a user and include an indication of a particular industrial automation equipment 16 that the user intends to perform a maintenance operation, examine, or inspect. The input data may be received from a sensor 18 of the industrial automation equipment 16. The sensor 18 may send the input data, which may include a request to place the industrial automation equipment 16 offline and a parameter or property of the industrial automation equipment 16. The parameter or property of the industrial automation equipment 16 may be indicative of a potential fault. For example, the input from the sensor 18 may be sent to the processor 36 when the industrial automation equipment 16 has a temperature measurement above a threshold, or the like. Thus, the input data may also include parameter data that involves data that details certain properties (e.g., temperature, pressure, speed) of the industrial automation equipment 16.

The processor 36 may receive (block 54) one or more reasons for placing the piece of industrial automation equipment 16 offline. In some embodiments, the reasons may be entered by the user via a graphical user interface (GUI 45) displayed on the display 42 using the touch screen or one or more input peripherals attached to the computing device 26. The reasons may include a scheduled maintenance, a routine seasonal machine change, a diagnostic analysis, security purposes, or the like. It should be noted that, in some embodiments, the processor 36 may determine the reason for placing the industrial automation equipment 16 offline by analyzing one or more factors, such as the type of maintenance performed, the date/time at which the request was made, and so forth, in relation to historical data stored in the memory 37 and/or storage 38. Additionally, the cloud-based computing system 28 may determine the reason for placing the industrial automation device 16 offline by analyzing the factors mentioned above and comparing them to information stored in the databases 44.

In some embodiments, the processor 36 may determine (block 56) whether the defined rules (e.g., government regulations) stored in the regulations database 29 specify that the industrial automation equipment should be placed offline according to the lockout-tagout protocol based on the one or more reasons. For example, certain governmental regulations specify that the lockout-tagout protocol should be followed when placing certain types of equipment offline for particular reasons. The certain types of equipment may include particularly complex equipment (e.g., large engines with downstream systems) and/or equipment that produces high voltages (e.g., transformer), among others. If the reasons that were provided by the user or determined by the processor 36 and/or the cloud-based computing system 28 match a reason specified for placing the particular equipment offline according to the lockout-tagout protocol in the defined rules, then the processor 36 may provide (block 58) the instructions (e.g., a first set of instructions) for placing the industrial automation equipment 16 offline according to the lockout-tagout protocol. In some embodiments, the lockout-tagout protocol may specify using lockout-tagout locks (e.g., lock device) to physically prevent the industrial automation equipment 16 from being placed online when placing the equipment 16 offline and/or using lockout-tagout tags. For example, one step of the first set of instructions may include actuating a lock device that physically prevents the industrial automation equipment 16 from being placed online In some embodiments, the instructions may be displayed by the display 42 via software executing on the computing device 26.

However, in some embodiments, the lockout-tagout protocol may not be relevant when placing the equipment offline for reasons not specified by the defined rules or regulations. Accordingly, if the software determines that the reasons that the industrial automation equipment 16 is being placed offline do not correspond to certain regulations, the processor 36 may provide (block 60) instructions (e.g., a second set of instructions) to place the industrial automation equipment 16 offline without using the lockout-tagout protocol. For example, the instructions may instruct the user to not use lockout-tagout locks (e.g., lock device) and/or tags when placing the equipment offline. However, it should be noted that the instructions may still take care to instruct the user regarding how to place the equipment offline while omitting certain steps specific for lockout-tagout protocol.

The processor 36 may track and maintain (block 62) various statistics regarding the industrial automation equipment 16 that is placed offline. In some embodiments, the statistics may be sent to the cloud-based computing system 28. The statistics may include an amount of time the industrial automation equipment 16 is offline in relation to an amount of time the industrial automation equipment is online, the number of maintenance operations performed on the industrial automation equipment 16, the reasons for placing the equipment 16 offline, whether placing the equipment 16 offline was scheduled or unscheduled, and so forth. The statistics may be used to keep track of the health of the industrial automation equipment 16 and the overall state of the facility in which the industrial automation equipment 16 operate. For example, the statistics may indicate that a particular industrial automation equipment 16 has been placed offline more than a threshold number of times within a certain time period, has been placed offline for a particular reason, and the like. In one example, the processor 36 may determine the overall state of the facility is satisfactory when a threshold number of industrial automation equipment 16 have not been placed offline more than a threshold number of times in a certain period of time. In another example, the processor 36 may determine the overall state of the facility is unsatisfactory when a threshold number of industrial automation equipment 16 have been placed offline more than a threshold number of times in a certain period of time. The processor 36 may display an alert on the display 42 based on the statistics. Further, the statistics may be analyzed to predict when certain events regarding the industrial automation equipment 16 may occur in the future. For example, warnings may be displayed via the computing device 26 that suggest that a certain event may occur in the near future when the industrial automation equipment 16 is placed offline for a recognized reason based on the statistics, which may contain historical data and analysis regarding approximate timeframes for events occurring relative to when the equipment 16 is placed offline for certain reasons. In some embodiments, the processor 36 may control the operation of the industrial automation equipment 16 based on the statistics. For example, the processor 36 may prevent the industrial automation equipment 16 from being placed in service if the industrial automation equipment 16 is placed offline more than a threshold number of times in a certain time period. After collecting data (e.g., statistics), any user may observe the data regarding various equipment 16 by using a computing device 26 to retrieve the data from the cloud-based computing system 28 and to display the data on the display 42 of the computing device 26.

For example, in some embodiments, the processor 36 may retrieve the data (e.g., statistics) from the memory 37 or receive the data from the cloud-based computing device 28 and generate a visualization to be displayed by the display 42. The visualization may include a graphical user interface (GUI 45) that may include a flat layout of the facility and objects representative of the industrial automation equipment 16 in the facility. In some embodiments, the GUI 45 may include a virtual first person view of three dimensional (3D) industrial automation equipment 16 objects that are within a certain proximity to the location of the computing device 26. The industrial automation equipment 16 objects may include one or more selectable links that retrieve the statistics for the particular industrial automation equipment 16 object and display the statistics on the GUI 45. For example, a user may select a link associated with a particular industrial automation equipment 16 and the GUI 45 may display the amount of time the industrial automation equipment 16 is offline in relation to an amount of time the industrial automation equipment is online, the number of maintenance operations performed on the industrial automation equipment 16, the reasons for placing the equipment 16 offline, whether placing the equipment 16 offline was scheduled or unscheduled, and so forth.

Figure 6:
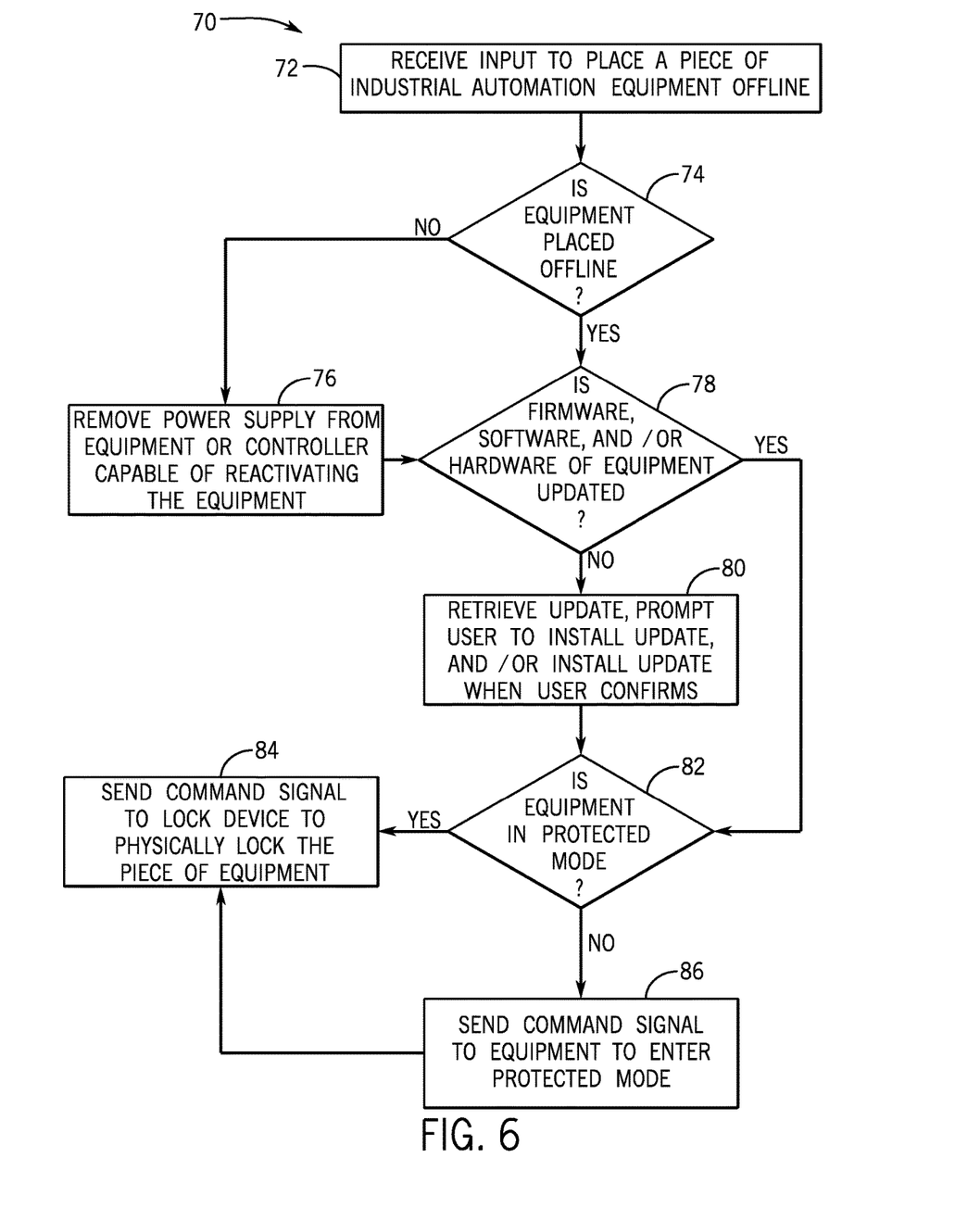
FIG. 6 is a flow chart of a method employed by a computing device for physically locking out devices when placing industrial automation equipment offline, in accordance with embodiments presented herein.

FIG. 6 is a flow chart of a method 70 employed by the computing device 26 for physically locking out devices when placing the industrial automation equipment 16 offline, in accordance with embodiments presented herein. The method 70 may be implemented as computer instructions stored on the one or more tangible, non-transitory computer-readable medias (e.g., memories 37) and executable by the one or more processors 36. Although the following description of the method 70 is described with reference to the processor 36 of the computing device 26, it should be noted that the method 70 may be performed by one or more other processors disposed on other devices that may be capable of communicating with the cloud-based computing system 28, the control/monitoring device 14, the industrial automation equipment 16, or other components associated with the industrial application 24. Additionally, although the following method 70 describes a number of operations that may be performed, it should be noted that the method 70 may be performed in a variety of suitable orders and all of the operations may not be performed. It should be appreciated that the method 70 may be wholly executed by the computing device 26 (e.g., tablet) or the execution may be distributed between the cloud-based computing system 28 and the computing device 26.

In general, the method 70 may be used by the computing device 26 to secure a piece of industrial automation equipment 16 or block the piece of industrial automation equipment 16 from being placed in service. As such, the method 70 may be used as a security feature to block the piece of industrial automation equipment 16 from being activated remotely (e.g., from a connected device) or locally (e.g., by the user interacting with the industrial automation equipment 16). This may function as an integral part of a lockout-tagout procedure.

Referring now to the method 70, the processor 36 may receive (block 72) input regarding a request to place a piece of industrial automation equipment 16 offline. As previously discussed, the input may be a request from the user and/or triggered by the sensors 18 based on detected data. In some embodiments, prior to the user entering the input, the processor 36 may have authorized the identity of the user by verifying credentials, scanning a badge, reading fingerprints, using facial recognition techniques, or the like. The processor 36 may determine (block 74) whether the industrial automation equipment 16 is placed offline. If the industrial automation equipment 16 is not already placed offline, the processor 36 may remove (block 76) a power supply from industrial automation equipment or a controller associated with the industrial automation equipment 16. To achieve this, the processor 36 may send a signal to a power source coupled to the equipment 16 to turn off or remove power (e.g., open a circuit breaker, contactor, switch, or relay). It should be noted that, in some embodiments, the signal from the processor 36 may cause the power source coupled to the controller to supply low voltage to the controller. Further, in some embodiments, the processor 36 may monitor the industrial automation equipment 16 and/or controller associated with the offline industrial automation equipment 16 and permit the power to be reactivated via a signal from the processor 36 (e.g., prevents reactivation commands from other devices from reactivating the power).

After the power is removed from the industrial automation equipment 16 in block 76 or if the industrial automation equipment 16 is already offline at block 74, the processor 36 may determine whether the firmware, software, and/or hardware of the industrial automation equipment 16 is updated (block 78). In some embodiments, the processor 36 may check the revision history of the industrial automation equipment 16 being placed offline and any associated industrial automation equipment and/or controllers. For example, the processor 36 may obtain the versions of the firmware, software, and/or hardware included in the industrial automation equipment 16 and consult the cloud-based computing system 28 or the Internet to determine whether the current versions are the latest versions available. If the versions of the firmware, software, and/or hardware are not updated, the processor 36 may retrieve the update (e.g., download files), prompt the user to install the update, and/or install the update when the processor 36 receives installation confirmation from the user (block 80). In some embodiments, the updates may be automatically installed if the update is related to main functionality of the industrial automation equipment 16. Also, in some embodiments, if the hardware is outdated or begins to suffer from declining performance, the processor 36 may prompt the user to install a newer version of the hardware (e.g., processor, hard drive, or memory). In some embodiments, the processor 36 may prevent the industrial automation equipment 16 from being placed back in service until the firmware, software, and/or hardware updates are installed. That is, the processor 36 may deny input from the user and/or sensors 18 to reactivate the industrial automation equipment 16 until the updates are installed. Additionally, in some embodiments, the processor 36 may run various tests after the installation is completed to verify that the installation was performed correctly and successfully before the industrial automation equipment 16 is reactivated.

After the updates are installed or if the firmware, software, and/or hardware are already updated, the processor 36 may determine whether the industrial automation equipment 16 is in a protected mode (block 82). One such protected mode is when the industrial automation equipment 16 is placed offline. If the industrial automation equipment 16 is in a protected mode, the processor 36 may send a command signal to a lock device to physically lock the piece of industrial automation equipment 16 (block 84). In some embodiments, physically locking the equipment 16 may prevent the equipment 16 from being placed back in service. For example, a power switch of the industrial automation equipment 16 may be physically locked in the off position and incapable of being moved to the on position. Also, physically locking the industrial automation equipment 16 may prevent the equipment 16 from being activated remotely (e.g., from another device besides the computing device 26) or may prevent technicians operating on the industrial automation equipment 16 locally. Additionally, when the industrial automation equipment is not in a protected mode, the processor 36 may send a command signal to the equipment 16 to enter a protected mode (block 86). Then, the processor 36 may send the command signal to the lock device to physically lock the piece of industrial automation equipment 16 (block 84). As may be appreciated, the various operations described above may enable the software executed by the processor 36 to prevent the industrial automation equipment 16 from returning to service until desired. The data related to a status of the lock device, the version of the firmware, software, and/or hardware installed in the industrial automation equipment 16, and/or the mode (e.g., protected mode) of the industrial automation equipment 16 may be stored in the memory 37 and/or sent to the cloud-based computing system 28.

As such, in some embodiments, a status (e.g., locked or unlocked) of the lock device, the version of the firmware, software, and/or hardware installed in the industrial automation equipment 16, and/or the mode (e.g., protected mode) of the industrial automation equipment 16 may be visible to the user via the GUI 45 described above. The processor 36 may retrieve the data from the memory 37 and display the data associated with particular industrial automation equipment 16. Further, any user may use a computing device 26 to access the data from the cloud-based computing system 28 and display the information on the display 42 of the computing device 26. As discussed above, the GUI 45 may include a flat layout of the facility including the industrial automation equipment 16 objects arranged in the layout in their relative locations in the facility. The objects may include selectable links that show the data described above. For example, selecting a particular industrial automation equipment 16 may show the status of the lock device as being locked, the mode of the equipment 16 as being the protected mode, and the versions of the firmware, software, and/or hardware installed in the equipment 16. Further, in some embodiments, a message may be displayed indicating that the versions of the firmware, software, and/or hardware are up to date or are outdated.

Figure 7:
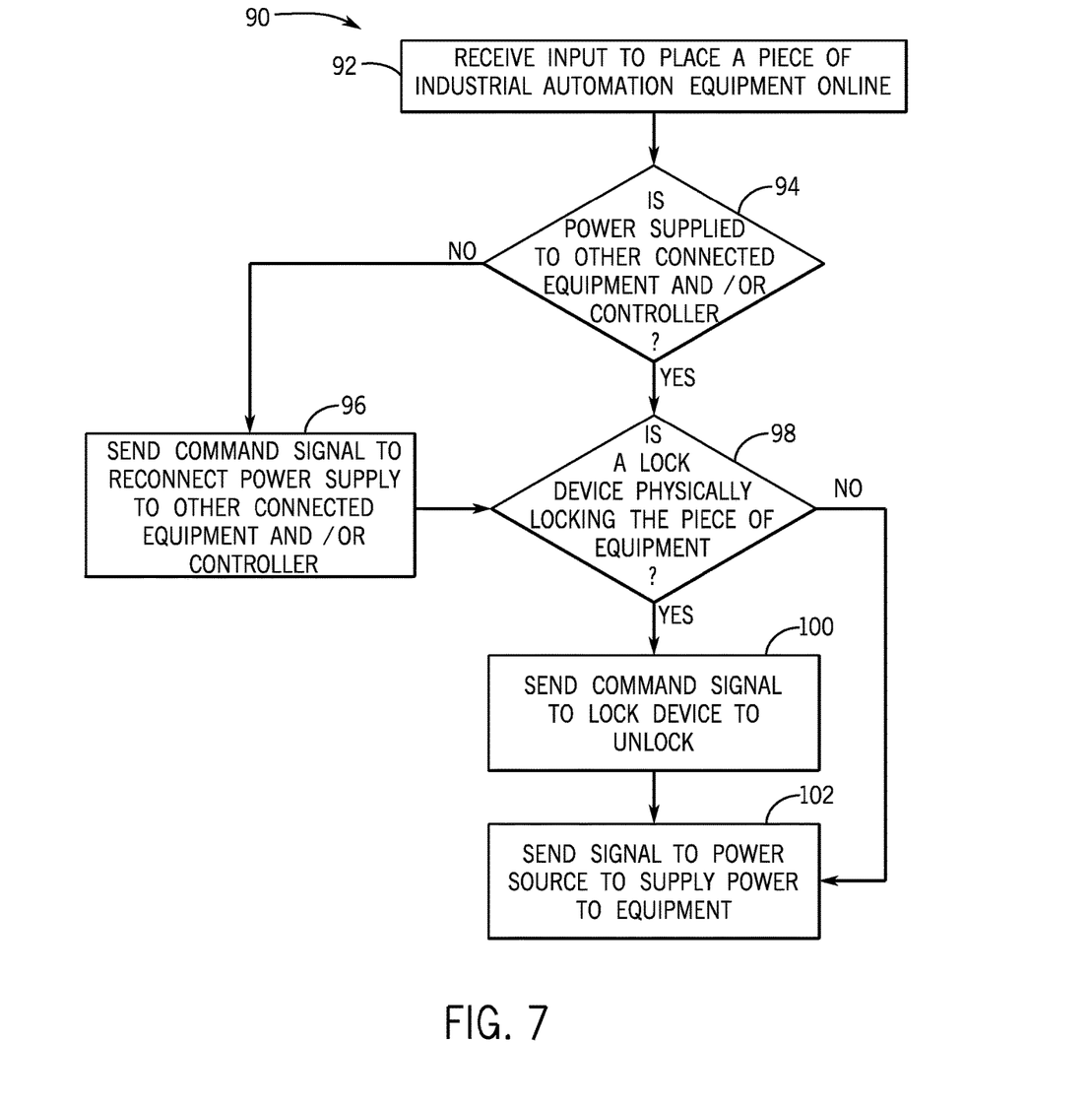
FIG. 7 is a flow chart of a method employed by a computing device for performing operations when placing industrial automation equipment online, in accordance with embodiments presented herein.

FIG. 7 is a flow chart of a method 90 employed by the computing device 26 for performing operations when placing the industrial automation equipment 16 online, in accordance with embodiments presented herein. The method 90 may be implemented as computer instructions stored on the one or more tangible, non-transitory computer-readable medias (e.g., memories 37) and executable by the one or more processors 36. Although the following description of the method 90 is described with reference to the processor 36 of the computing device 26, it should be noted that the method 90 may be performed by one or more other processors disposed on other devices that may be capable of communicating with the cloud-based computing system 28, the control/monitoring device 14, the industrial automation equipment 16, or other components associated with the industrial application 24. Additionally, although the following method 90 describes a number of operations that may be performed, it should be noted that the method 90 may be performed in a variety of suitable orders and all of the operations may not be performed. It should be appreciated that the method 90 may be wholly executed by the computing device 26 (e.g., tablet) or the execution may be distributed between the cloud-based computing system 28 and the computing device 26.

Referring now to the method 90, at block 92, the processor 36 may receive an input to place a piece of the industrial automation equipment 16 online. The input may be received from the user entering the request via a graphical user interface (GUI 45) shown on the display 42 or one or more input peripherals and/or the input may be received from a sensor 18 based on certain detected conditions. The various conditions that may trigger the sensor 18 to send the input may include the sensor 18 detecting that a temperature of the piece of the industrial automation equipment 16 has reduced below a threshold temperature for a duration of time, the sensor 18 detecting a reduction in air pollutants, the sensor 18 detecting vibrations that exceed a threshold, and the like.

The processor 36 may determine (block 94) whether power is supplied to other connected industrial automation equipment and/or controllers. If power is not supplied, then the processor 36 may send (block 96) a command signal to reconnect the power supply to the other connected industrial automation equipment and/or controllers. After the command signal is sent and power is supplied or if the power is already supplied, then the processor 36 may determine (block 98) whether a lock device is physically locking the piece of industrial automation equipment 16. For example, the lock device may physically lock the piece of industrial automation equipment 16 by using a physical restraint (e.g., cable, bar) to physically keep a circuit breaker, contactor, relay, switch, or the like, open. If the lock device is physically locking the industrial automation device 16, then the processor 36 may send (block 100) a command signal to the lock device to unlock the industrial automation device 16, thereby enabling the industrial automation equipment 16 to be placed online. After the lock device is unlocked or if the lock device is already unlocked, the processor 36 may send (block 102) a signal to a power source coupled to the industrial automation equipment 16 to supply power to the equipment 16.

The lock device (e.g., electronic lock) may be electronically controlled by the computing device 26 and/or the cloud-based computing system 28. As such, the lock device may include communication circuitry to receive and send signals, a processor to execute commands sent in the signals, and a mechanical lock that is actuated based on commands from the processor. In some embodiments, the mechanical lock may be engaged (e.g., locked) when a circuit included in the lock device is closed and may be disengaged (e.g., unlocked) when the circuit is opened by the processor of the lock device based on signals sent from the computing device 26 and/or the cloud-based computing system 28. That is, the processor of the electronic lock may receive a command signal from the computing device 26 and/or the cloud-based computing system 28 and cause the circuit to close, thereby actuating the mechanical lock into a locked position. Also, the processor may cause the circuit to open, thereby actuating the mechanical lock into an unlocked position. In some embodiments, the command signals may be sent to the lock device according to the lockout-tagout protocol.

It should be noted that the methods 50, 70 and 90 are performed using the processor 36 that is part of the computing device 26 and the cloud-based computing system 28. The computing device 26 and the cloud-based computing system 28 are configured to execute software applications that enable each device to interact with the industrial automation equipment 16. As such, the computing device 26 and the cloud-based computing system 28 are tied to particular machines, such that a tri-partite system is created to assist in the management and operations of the industrial automation equipment 16, and thus the industrial application 24. Moreover, it should be noted that the data received by the computing device 26, the cloud-based computing system 28, the industrial automation equipment 16, or the control/monitoring device 14 may be transformed when being transmitted, analyzed, or depicted for view by a user of the respective device. For example, the input received by the sensor 18 and/or the processor 36 from the display 42 or an input peripheral of the computing device 26 may be transformed into instructions displayed to the user to place the industrial automation equipment 16 offline according to the lockout-tagout protocol.

Technical effects of the embodiments described herein include coordinating the transfer of data between the computing device 26, the cloud-based computing system 28, and the industrial automation equipment 16. By efficiently sharing data between these components, operations and maintenance of the industrial application 24 may be performed more efficiently. Further technical effects may include displaying instructions to guide a technician in placing the industrial automation equipment 16 offline according to the lockout-tagout protocol when the reason provided for placing the equipment 16 offline is specified as a reason to use the lockout-tagout protocol in government regulations. Also, the embodiments disclosed herein include tracking statistics of the industrial automation equipment 16, and providing software restraints to returning the equipment 16 back to service. Although the above system and techniques are described with regard to the industrial application 24, it should be understood that the system and techniques may apply to any regulated industry, such as pharmaceutical, oil and gas, food and beverage, and so forth.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A non-transitory computer readable medium comprising computer instructions, when executed by a processor, configured to cause the processor to:
   receive an input associated with placing a piece of industrial automation equipment offline, wherein the input comprises:
      a type of the piece of industrial automation equipment; and
      one or more reasons for placing the piece of industrial automation equipment offline;
   determine whether the input corresponds to one or more regulations associated with placing the piece of industrial automation equipment offline based on the type and the one or more reasons;
   control a display to present a first set of instructions regarding a first set of tasks associated with placing the piece of industrial automation equipment offline in response to the input corresponding to the one or more regulations;
   control the display to present a second set of instructions regarding a second set of tasks associated with placing the piece of industrial automation equipment offline in response to the input not corresponding to the one or more regulations;
   determine whether an update related to software, firmware, or hardware associated with the piece of industrial automation equipment is available in response to the piece of industrial automation equipment being offline based on the type of the piece of industrial automation equipment and the one or more reasons for placing the piece of industrial automation equipment offline; and
   actuating a lock device configured to prevent the piece of industrial automation equipment from being placed back in service in response to determining that the update is available, wherein the lock device is configured to prevent placing the piece of industrial automation equipment online by physically locking the piece of industrial automation equipment in response to the piece of industrial automation equipment being offline.

2. The computer readable medium of claim 1, wherein the first set of instructions comprise one or more steps for placing the piece of industrial automation equipment offline according to a lockout-tagout protocol.

3. The computer readable medium of claim 1, wherein the second set of instructions comprise one or more steps for placing the piece of industrial automation equipment offline without regard to a lockout-tagout protocol.

4. The computer readable medium of claim 1, wherein the computer instructions are configured to cause the processor to maintain one or more statistics regarding the piece of industrial automation equipment being placed offline, wherein the statistics comprise a number of times the piece of industrial automation equipment has been placed offline in a certain timeframe, a type of maintenance performed on the piece of industrial automation equipment when offline, one or more durations of time the piece of industrial automation equipment is offline, one or more reasons why the piece of industrial automation equipment is placed offline, or some combination thereof.

5. The computer readable medium of claim 4, wherein the computer instructions are configured to cause the processor to determine a health of the piece of industrial automation equipment based on the statistics, an overall state of a facility in which the industrial automation equipment operates based on the statistics, or both.

6. The computer readable medium of claim 4, wherein the computer instructions are configured to cause the processor to present an alert on the display based on the statistics, predict an occurrence of an event associated with the piece of industrial automation equipment in the future based on the statistics, display a warning including a prediction of the occurrence of the event, control an operation of the piece of industrial automation equipment based on the statistics, or some combination thereof.

7. The computer readable medium of claim 1, wherein the computer instructions are configured to cause the processor to access the one or more regulations in a remote database storing government dictated regulations.

8. The computer readable medium of claim 1, wherein the one or more reasons are entered by a user.

9. The computer readable medium of claim 1, wherein the computer instructions are configured to cause the processor to determine the one or more reasons based on at least a type of service being requested to be performed on the industrial automation equipment when offline.

10. A method, comprising:
   receiving, via a processor, an input associated with placing a piece of industrial automation equipment offline, wherein the input comprises:
      a type of the piece of industrial automation equipment; and
      one or more reasons for placing the piece of industrial automation equipment offline;
   determining, via the processor, whether the input corresponds to one or more government regulations associated with placing the piece of industrial automation equipment offline;
   displaying, via the processor, a first set of instructions regarding a first set of tasks associated with placing the piece of industrial automation equipment offline in response to the input corresponding to the one or more government regulations;

displaying, via the processor, a second set of instructions regarding a second set of tasks associated with placing the piece of industrial automation equipment offline in response to the input not corresponding to the one or more government regulations;

determining, via the processor, whether an update related to software, firmware, or hardware associated with the piece of industrial automation equipment is available in response to the piece of industrial automation equipment being offline based on the type of the piece of industrial automation equipment and the one or more reasons for placing the piece of industrial automation equipment offline; and actuating, via the processor, a device configured to prevent the piece of industrial automation equipment from being placed online in response to determining that the update is available, wherein the device is configured to prevent placing the piece of industrial automation equipment online by physically locking the piece of industrial automation equipment when the piece of industrial automation equipment is offline.

11. The method of claim 10, comprising sending, via the processor, a command to the device, wherein the device is configured to prevent an activation of the piece of industrial automation equipment, wherein the device is configured to physically lock the piece of industrial automation equipment after the first set of instructions or the second set of instructions is performed.

12. The method of claim 10, comprising sending, via the processor, a signal to a power supply associated with the piece of industrial automation equipment to turn off power in response to the piece of industrial automation equipment being offline.

13. The method of claim 10, comprising:
receiving, via the processor, an input to place the piece of industrial automation equipment online;
sending, via the processor, a first signal to the device, wherein the first signal is configured to cause the device to unlock the piece of industrial automation equipment; and
sending, via the processor, a second signal to a power supply associated with the piece of industrial automation equipment to power on.

14. The method of claim 10, wherein actuating the device comprises closing an electric circuit included in the device to physically lock the piece of industrial automation equipment.

15. A system, comprising:
a lock device configured to prevent placing a piece of industrial automation equipment online by physically locking the piece of industrial automation equipment when the piece of industrial automation equipment is offline; and a computing device configured to:
receive an input associated with placing the piece of industrial automation equipment offline, wherein the input comprises:
a type of the piece of industrial automation equipment; and
one or more reasons for placing the piece of industrial automation equipment offline;
determine whether the input corresponds to one or more government regulations associated with placing the piece of industrial automation equipment offline based on the type and the one or more reasons;
control a display to present a first set of instructions regarding a first set of tasks associated with placing the piece of industrial automation equipment offline when the input corresponds to the one or more government regulations, wherein the first set of instructions includes a lockout-tagout protocol that specifies using at least the lock device;
control the display to present a second set of instructions regarding a second set of tasks associated with placing the piece of industrial automation equipment offline when the input does not correspond to the one or more government regulations, wherein the second set of instructions does not include the lockout-tagout protocol that specifies using the lock device;
determine whether an update related to software, firmware, or hardware associated with the piece of industrial automation equipment is available when the piece of industrial automation equipment is offline; and
actuating the lock device to prevent the piece of industrial automation equipment from being placed back in service in response to determining that the update is available.

16. The system of claim 15, wherein the computing device is configured to prevent the piece of industrial automation equipment from being placed online until software, firmware, hardware, or some combination thereof of the piece of industrial automation equipment are updated when the piece of industrial automation equipment is offline.

17. The system of claim 15, wherein the computing device is configured to provide the first set of instructions based on the one or more reasons.

18. The system of claim 15, wherein the at least one step of the first set of instructions comprises actuating the lock device by the computing device sending a command signal to the lock device to close a circuit included in the lock device.

19. The system of claim 15, wherein the lock device comprises a mechanical lock configured to prevent the piece of industrial automation equipment from being placed back in service in response to determining that the update is available.

* * * * *